(12) United States Patent
Hocken et al.

(10) Patent No.: US 6,750,636 B2
(45) Date of Patent: Jun. 15, 2004

(54) REDUNDANT FIELD DRIVE FOR AN ELECTRIC MACHINE

(75) Inventors: Lary Robert Hocken, Davison, MI (US); Stephen Wayne Anderson, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 100 days.

(21) Appl. No.: 10/128,874

(22) Filed: Apr. 24, 2002

(65) Prior Publication Data

US 2003/0201756 A1 Oct. 30, 2003

(51) Int. Cl.$^7$ ................................................ H02P 9/00
(52) U.S. Cl. ................................ 322/63; 322/59; 290/5; 307/64
(58) Field of Search ................................ 322/28, 59, 6, 322/90; 290/5, 7, 8; 307/64

(56) References Cited

U.S. PATENT DOCUMENTS

| | | | | |
|---|---|---|---|---|
| 4,168,459 A | * | 9/1979 | Roesel, Jr. ................ | 322/29 |
| 4,535,252 A | * | 8/1985 | Jacobs et al. .............. | 290/44 |
| 4,677,365 A | * | 6/1987 | Yang .......................... | 322/90 |
| 4,701,690 A | * | 10/1987 | Fernandez et al. ........ | 322/28 |
| 5,059,886 A | * | 10/1991 | Nishimura et al. ........ | 322/28 |
| 5,166,538 A | * | 11/1992 | Norton ...................... | 307/10.1 |
| 5,332,927 A | * | 7/1994 | Paul et al. ................. | 307/66 |
| 5,631,544 A | * | 5/1997 | Syverson et al. .......... | 322/46 |
| 5,656,922 A | * | 8/1997 | LaVelle et al. ............ | 322/46 |

* cited by examiner

*Primary Examiner*—Nicholas Ponomarenko
(74) *Attorney, Agent, or Firm*—Jimmy L. Funke

(57) ABSTRACT

An electric power generating system comprising: a generator including an alternator and regulator, the regulator including a normal field control and a redundant field control with a default field command and a selector for selecting between the normal field control and the redundant field control. Further disclosed, is a method of providing excitation to an alternator, comprising: receiving a field default signal indicative of an inoperative normal field control and a normal field command responsive to the normal field control, indicative of a desired duty cycle command to a field coil of an alternator. The method further includes determining if a supply voltage is greater than a selected value and formulating a default field command; transmitting a field drive responsive to the default field command to a field coil of the alternator if the field default signal is asserted.

33 Claims, 4 Drawing Sheets

REDUNDANT FIELD DRIVE FOR AN ELECTRIC MACHINE

BACKGROUND

This invention relates to automotive electric generators or alternators. In many systems, the generator includes an alternator and a voltage regulator. Often the voltage regulator (hereinafter regulator) is integral with the alternator, but not necessarily so. The regulator controls the output voltage of the alternator to a calibrated voltage set point. The voltage is controlled by a regulation scheme, which adjusts the duty cycle on the rotor winding (often called the field or field coil) of the alternator. The output of the alternator is directly related to the duty cycle of the field coil, and the rotational speed of the rotor. The regulator also establishes a desired system voltage (called a set-point voltage) that the voltage regulator attempts to maintain. This set-point voltage may be based on temperature, a pulse width modulated (PWM) based customer input, or a serial data link customer input.

For normal operation, when the actual system voltage (for example, voltage measured at the battery) increases above the set-point voltage, the average duty cycle on the field is decreased in an attempt to decrease the alternator output voltage, and thereby the system voltage, to the set-point. When the actual system voltage decreases below the set-point voltage, the average duty cycle on the field is increased in an attempt to increase the system voltage to the set-point This formulates the basis of PWM field control and establishes a limit cycle around the set-point voltage.

Unfortunately, certain conditions and faults (e.g., the loss of the main clock, power supply or interconnection and the like) may occur within the voltage regulators that result in completely disabling the output to the field coil and thereby resulting in loss of generated power. Therefore, it would be desirable to establish a capability to maintain alternator operation and improve vehicle operability in light of such considerations.

BRIEF SUMMARY

Disclosed herein is an electric power generating system comprising: an alternator and a voltage regulator, the voltage regulator including a normal field control and a redundant field control, and a selection apparatus for selecting between the normal field control and the redundant field control.

Also disclosed herein is an electric machine comprising: an alternator, and a regulator, the regulator includes a normal field control and a redundant field control coupled to the alternator, and a selection apparatus for selecting between the normal field control and the redundant field control.

Further disclosed, is a method of providing excitation to an electric machine in an electric power generating system with an alternator and a regulator. The method comprises: receiving a field default signal indicative of an inoperative normal field control and a normal field command responsive to the normal field control, indicative of a desired duty cycle command to a field coil of an alternator in a generator including an alternator and regulator. The method further includes determining if a supply voltage is greater than a selected value and formulating a default field command; transmitting a field drive responsive to the default field command to the field coil of the alternator if the field default signal is asserted. The regulator includes a normal field control and a redundant field control.

An electric machine for providing a source of electrical power, comprising: an alternator; a first means for determining and providing an excitation for a field coil of the alternator; a second means for determining providing an excitation for the field coil of the alternator, the second means providing the excitation if the first means is inoperative; and a means for determining whether the first means is inoperative.

A regulator for providing excitation to an alternator in an electric power generating system with an alternator comprising: means for receiving a field default signal indicative of an inoperative normal field control; means for receiving a normal field command responsive to the normal field control, indicative of a desired duty cycle command to a field coil of an alternator in a generator including an alternator and regulator. The regulator further includes: means for determining if a supply voltage greater than selected value and formulating a default field command; means for transmitting a field drive responsive to the default field command to the field coil of the alternator if the field default signal is asserted. The regulator also includes an operational field control and a redundant field control.

DETAILED DESCRIPTION OF AN EXEMPLARY EMBODIMENT

Disclosed herein in an exemplary embodiment is a redundant control algorithm configured to maintain a fixed set-point voltage for a vehicle power system even when certain faults occur that would otherwise result in loss of generator system operation. More particularly, in an exemplary embodiment a circuit is implemented that monitors the input system voltage (also denoted $B^+$ in FIGS. 2 and 3), and creates an asynchronous (e.g., not linked to any clock or clocking in the control system) control command to result in vehicle power system response with a limit cycle around a fixed voltage set point. This allows the alternator to continue to generate power and the battery to continue to charge as needed, and yet prevents undercharging/overcharging the battery. It should be appreciated that generally in the art, alternator refers to an alternating current electric machine, while generator often refers to an electric machine with a direct current output (often as a function of rectification) responsive to a regulation scheme. As used herein, alternator shall be utilized to denote either configuration. As is well known in the current art, alternators often include the components to rectify and regulate the generated voltage.

A preferred embodiment, by way of illustration is described herein as it may be applied to a vehicle power system such as may be employed in an automobile. While an exemplary embodiment is shown and described with application to an automobile power system, it will be appreciated by those skilled in the art that the disclosure is not limited to automotive alternators and electric power generation systems, but is also applicable to any device such as a generator or alternator where field current control is employed. Moreover, it should further be appreciated other methodologies to implement a redundant operational mode for the alternator are possible, as a subset of the embodiment disclosed herein. For example, using a fixed output duty cycle on the field coil would provide a fixed level of power from the generator system, but would not address variations in load and could still discharge or overcharge the battery. Similarly, zero or full excitation of the field coil would once again, not address variations in load and could still discharge or overcharge the battery.

Figure 1:
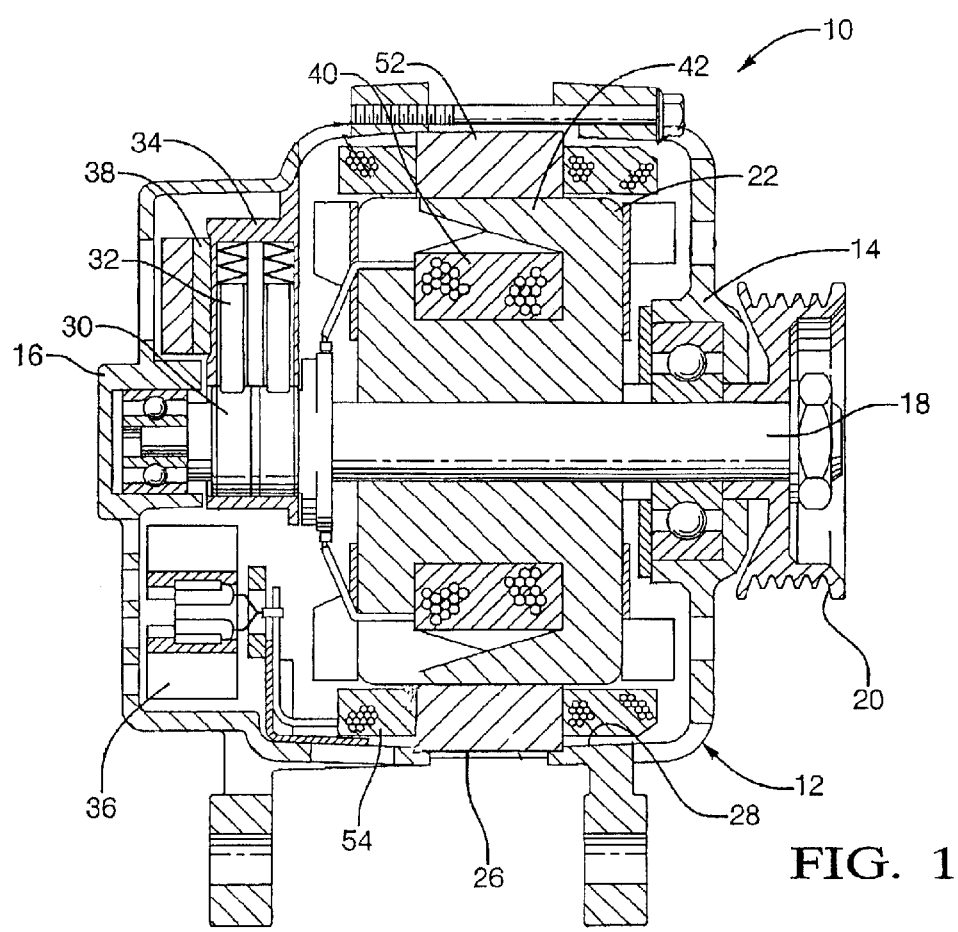
FIG. 1 is a cutaway section depicting an exemplary alternator.

Referring to FIG. 1, alternator 10 has a case 12 comprising a pair of casing members 14 and 16, for example an aluminum front casing 14 and an aluminum rear casing 16. A shaft 18 is rotatably received within the case. A pulley 20 is secured to one end of shaft 18. A Lundell-type rotor 22 is also secured to shaft 18. A stator 26 is secured or positioned adjacent to an inner wall 28 of the case 12.

Slip rings 30 are secured to shaft 18 at the opposite end of pulley 20. Slip rings 30 supply electric current to rotor 22; a pair of brushes 32 moving in contact with the slip rings 30; brush holders 34 accommodating the brushes; a rectifier bridge 36 in electrical contact with the stator for converting the alternating current generated in the stator 26 to a direct current; and a regulator 38 fitted over the brush holder 34 for adjusting the magnitude of the alternating current generated in the stator 26. It will be appreciated that while the alternator 10 described herein includes an integral rectifier bridge 36 and regulator 38, they need not be so located. Internal and external configurations for such components are possible and envisioned. Moreover, while the alternator 10 herein is also described including brushes 32 and slip rings 30, other alternative configurations for exciting the rotor windings are conceivable. For example, an electric machine or magnetic interface.

The rotor 22 comprises: a rotor field coil 40 here in after denoted as field coil for generating a magnetic flux when an electric current is passed therethrough; and a pole core 42 disposed so as to cover the field coil 40, in which magnetic poles are produced by the magnetic flux generated by the field coil 40. The stator 26 comprises: a stator core 52 through which a rotating magnetic field generated by the rotor 22 passes; and a stator coil 54 being a conductor wound around the stator core 52 through which a generated electric current flows.

In an alternator 10 of the above construction, a current is supplied from a source for example, a battery 60 (FIG. 2) through the brushes 32 and slip rings 30 to the field coil 40, whereby a magnetic flux is generated, giving rise to a magnetic field. At the same time, the pulley 20 is driven by a belt or other means and the rotor 22 is rotated by the shaft 18, so that a rotating magnetic field is imparted to the stator core 52 and electromotive force is generated in the stator coil 54.

Figure 2:
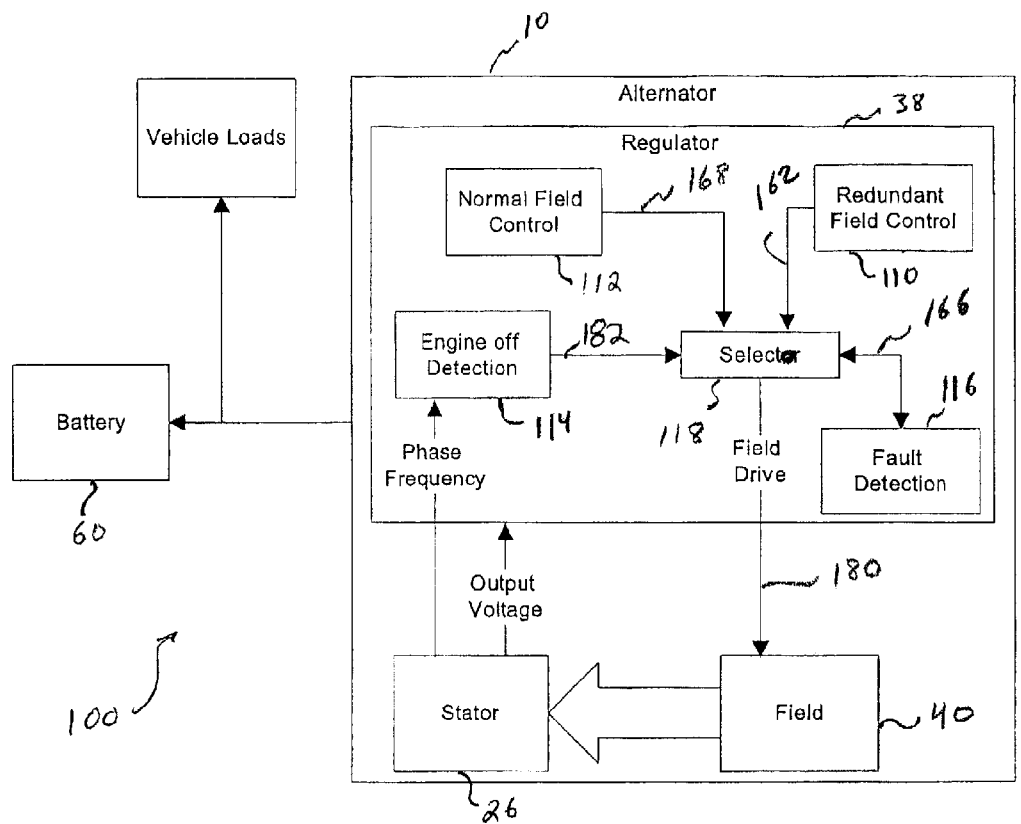
FIG. 2 is a block diagram depicting a generator control system.

Referring now to FIG. 2, a simplified block diagram of a vehicle power generation system 100 employing an exemplary embodiment is depicted. In an exemplary embodiment, a redundant field control 110 is coupled with an existing normal field control 112 in regulator 38 of the alternator 10. It should be noted that while an exemplary embodiment as described herein employs a pulse width modulation scheme for the normal field control, many alternatives should be apparent. The use of PWM in this application should not be considered as limiting.

The regulator 38 further includes an engine off detection 114 and fault detection 116. The redundant field control 110, the normal field control 112 are routed through a selector 118 to facilitate selective control of applying no control (for example, disabling or shutting the field off), the normal field control 112 (PWM operation) or the redundant field control 110 to excite the field coil 40 also denoted field coil of the alternator 10. The selector 118 is responsive to the engine off detection 114 and fault detection 116. The redundant field control 110, normal field control 112, engine off detection 114, fault detection 116, and selector 118 as described herein are treated as elements of the regulator 38. However, it should be appreciated that the exemplary embodiment could be implemented in various methodologies and configurations including, but not limited to, other controllers, processors, logic devices, discrete hardware, and the like, as well as combinations including at least one of the foregoing. It should be noted that excitation to the field coil 40 is described herein in terms of a current. However, it will be appreciated that configurations could be envisioned where the excitation could also be a voltage. The output of the alternator 10 is thereafter supplied to charge a battery 60 and power various vehicle loads.

The normal field control 112 may be configured to provide a field drive as a function of numerous vehicle parameters. For example, the field drive may be a function of engine speed, engine loading, temperature, selected loads, and the like, as well as combinations including at least one of the foregoing. Voltage regulation systems employing such schemes for controlling the voltage of an alternator are described and disclosed in U.S. Pat. No. 4, 459,489 by Kirk et al. and U.S. Pat. No. 4,636,706 by Bowman et al. The contents of which are incorporated by reference herein in their entirety.

Figure 3:
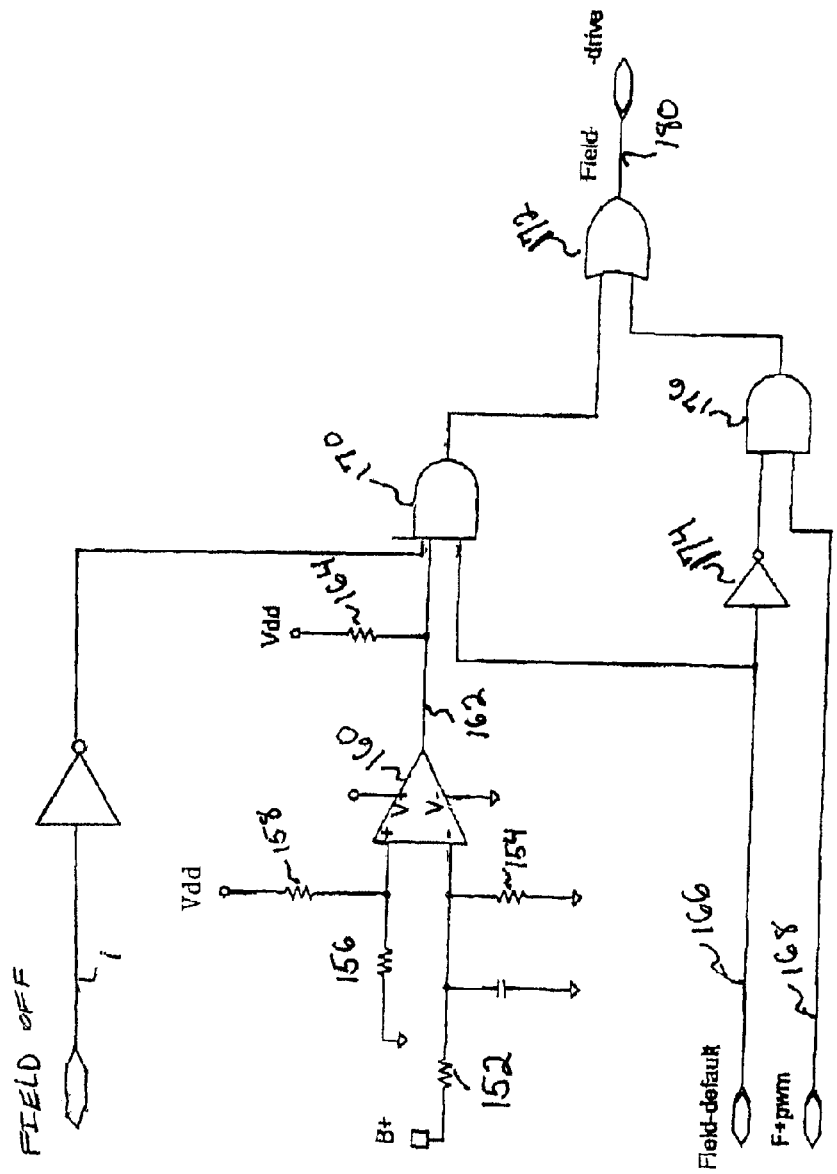
FIG. 3 depicts a schematic of an exemplary embodiment of a redundant field drive.

Turning now to FIG. 3 as well, a schematic depicting an implementation of an exemplary embodiment of a redundant field control 110 and selector 118 is shown. In the figure a default set-point voltage (e. g., 13.8 volts) is established by selecting the appropriate values for resistors 152, 154, 156, and 158 respectively. Comparison device, 160 for example, a comparator, op amp, summation, and the like monitors the B+ voltage as compared to the established set point. Resistor 164 provides supply pull-up for the output of comparator 160. If the B+ voltage is above the default set-point voltage, a default field command 162 is turned off. If the B+ voltage is below the set-point voltage, the default field command 162 is turned on. For many electrical system, the B+ voltage is nominally about 13.8 volts dc, with a range from about 11 volts dc to 16 volts dc. It should be appreciated that while a nominal system voltage and thus the default set-point voltage is described, other voltage ranges and set point voltages are anticipated and expected.

Logic devices 170, 172, 174, and 176 cooperate form a selector 118 for example, multiplexer, or signal selection circuit. When a fault is detected, fault detection 116, asserts a field-default signal 166 (logic level '1') indicating that the existing normal field control 112 is inoperative. The redundant field control 110 (described above) provides a default field command 162, which if enabled, is output to the field coil 40 of the alternator 10 as the Field drive 180.

The application of default field command 162 to the field coil 40 is interlocked with a determination as to whether the engine is running. This interlock avoids excess power consumption and potential battery drain. To determine if the engine is operating, the engine off detection 114 monitors the frequency of a stator output voltage, herein denoted phase frequency. If the phase frequency is less than a selected threshold, the likelihood is that the alternator 10 is not turning, and thus the engine is off and a field off signal 182 is generated. When the engine is off, the alternator is not driven and it cannot generate power, and thus the field coil 40 is not excited to avoid excessive power usage.

Additionally, when a field-default signal 166 is asserted (logic level '1') an indication is provided to the operator to signal a potential malfunction. Moreover, when a field-default signal 166 is asserted, the field drive 180 is turned on and off in response to the comparison at 160 (discussed above). This controls the output of the alternator 10 and the vehicle system voltage to a fixed voltage set-point and thereby provides commanded power independent of the existing normal field command 168. Conversely, when field-default signal 166 is not asserted (logic level '0'), indicating no fault, the normal field command 168 denoted F+pwm signal is output to the field drive 180 via logic devices 176 and 172 respectively.

This circuit configured in an exemplary embodiment is designed to be asynchronous, and not dependent upon any system clock or other timing related implementation, especially as employed by the normal field control 112. It will be appreciated that implementations employing independent timing mechanisms, clocks and the like may be applicable and would be within the scope of the disclosure herein. In an exemplary embodiment, as depicted in FIG. 3, the comparator includes no feedback. It will be appreciated that if desired, to reduce the free running oscillation rate for the redundant field control and then additional hysteresis may be added to the circuit on comparator 160. Moreover, disclosed and described herein in an exemplary embodiment is a configuration for a redundant field control 110, which should not be considered or interpreted as limiting. It will be appreciated that numerous configurations and implementations for the circuit configuration, topology, and selected components are possible and considered within the scope of this disclosure and the claims herein.

Figure 4:
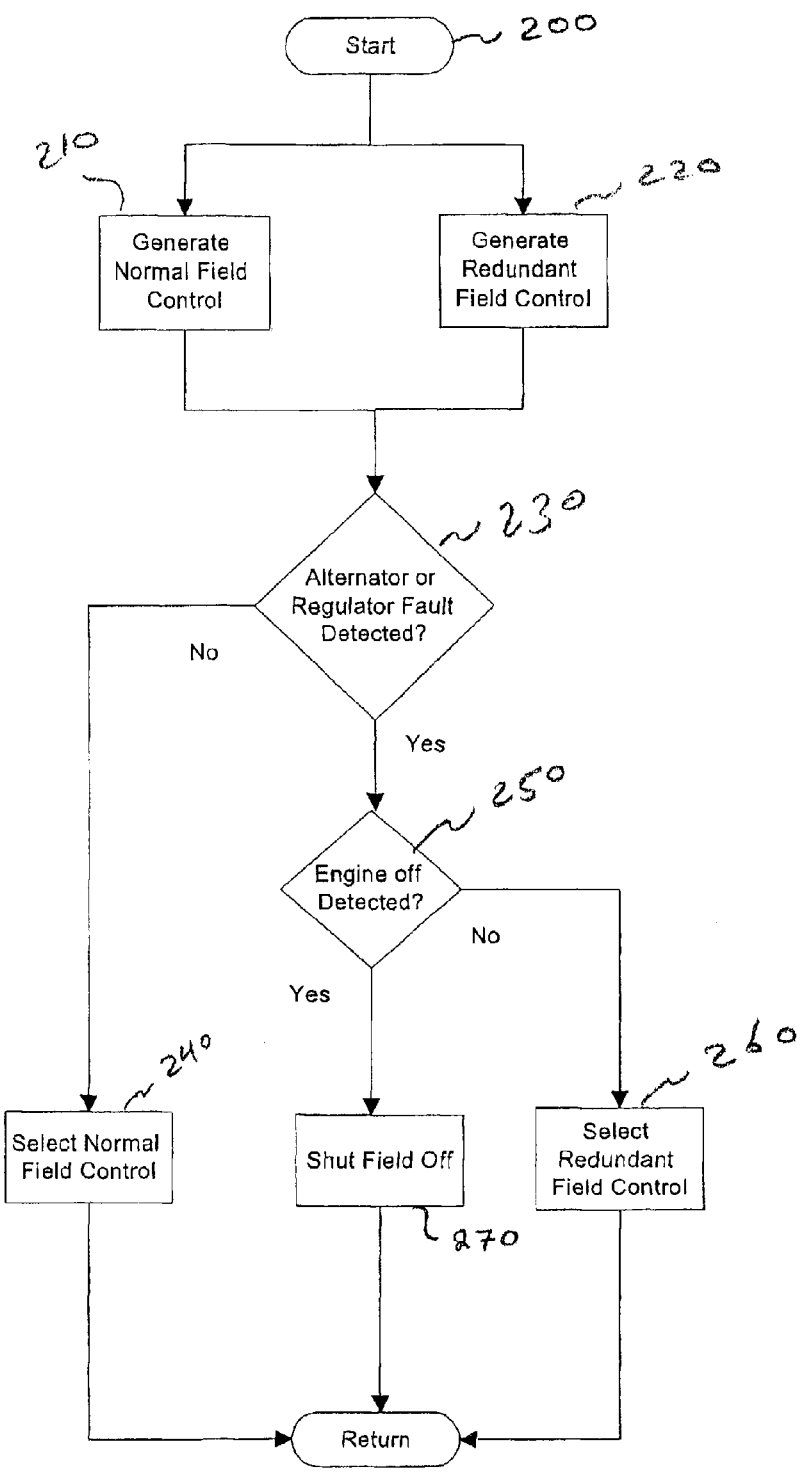
FIG. 4 depicts a flow diagram of an exemplary method for redundant field coil excitation.

Referring now to FIG. 4, a flow diagram depicting a method for exciting a field coil is shown. The method may be implemented by a recursive process such as might be employed in a controller or processor whether part of the regulator 38 or not. In order to perform the prescribed functions and desired processing, as well as the computations therefore (e.g., the redundant field control algorithm(s), and the like), the controller(s) may include, but not be limited to, a processor(s), computer(s), memory, storage, register(s), timing, interrupt(s), communication interface(s), and input/output signal interfaces, and the like, as well as combinations comprising at least one of the foregoing. For example, regulator 38 may include signal input signal filtering to enable accurate sampling and conversion or acquisitions of such signals from communications interfaces.

In the figure, the method is initiated at start block 200. At blocks 210 and 220, the normal field command 162 and the default field command 168 respectively are formulated. The status of the alternator 10 or regulator 38 is determined at decision block 230. If no fault is detected, the field default signal 166 is not asserted and the, the process continues to block 240 where the normal field control 112 is selected, and the normal field command 168 is transmitted as the field drive 180 to the field coil 40 of the alternator 10. If a fault is detected, at decision block 230, the field default signal 166 is asserted, the processing transfers to decision block 250 where a determination is made to whether the engine of the vehicle is running. If the engine is running, the redundant field control 110 is selected, and thereby, the process continues to block 260 where the default field command 162 is transmitted as the field drive 180 to the field coil 40 of the alternator 10. If it is determined that the engine is not running, the field is disabled as depicted at block 270.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric power generating system comprising:
    an alternator; and
    a regulator, including a normal field control and a redundant field control, and a selector for selecting between said normal field control and said redundant field control, said selector selecting said redundant field control when said normal field control is not operating.

2. The system of claim 1, wherein said regulator further includes fault detection, for determining and indicating whether said normal field control is not operating.

3. The system of claim 1, wherein said regulator further includes engine off detection, for determining and indicating that said alternator is not being operated.

4. The system of claim 3, wherein said engine off detection, includes frequency measurement to establish if a phase frequency of said alternator system exceeds a selected frequency threshold.

5. The system of claim 1, wherein said redundant field control includes a comparison device for determining if a supply voltage is greater than selected value for a set-point voltage.

6. The system of claim 5, wherein said comparison device includes a comparator.

7. The system of claim 5, wherein said selected value is about 13.8 volts.

8. The system of claim 5, wherein said comparison device includes hysteresis.

9. The system of claim 1, wherein said selection apparatus comprises a circuit of logic gates configured to transmit one of a default field command and a normal field command.

10. An electric machine comprising:
    an alternator;
    a regulator having a normal field control and a redundant field control each being coupled to said alternator;
    a means for determining and indicating whether said normal field control is not operative; and
    a selector for selecting between said operational field control and said redundant field control, said selector being responsive to said means for determining.

11. The electric machine of claim 10, wherein said regulator further includes an engine off detection, for determining and indicating that said alternator is not being operated.

12. The electric machine of claim 11, wherein said engine off detection, includes a frequency measurement to establish that a phase frequency exceeds a selected frequency threshold.

13. The electric machine of claim 10, wherein said redundant field control includes a comparison device for determining if a supply voltage is greater than a selected value for a set-point voltage of said electric machine.

14. The electric machine of claim 13, wherein said comparison device includes a comparator.

15. The electric machine of claim 13, wherein said selected value is about 13.8 volts.

16. The electric machine of claim 13, wherein said comparator includes hysteresis.

17. The electric machine of claim 10, wherein said selector comprises a circuit of logic gates configured to transmit one of a default field command and a normal field command.

18. A method for providing excitation to an electric machine in an electric power generating system with an alternator and a regulator with a controller executing the method, comprising:

receiving a field default signal indicative of an inoperative normal field control;

receiving a normal field command responsive to said normal field control, indicative of a desired duty cycle command to a field coil of the alternator;

formulating a default field command responsive to a selected value for a supply voltage;

selecting and transmitting a field drive responsive to said default field command to a field coil of the alternator if said field default signal is asserted; and wherein the regulator includes an normal field control and a redundant field control.

19. The method of claim 18, further including determining and indicating that said normal field control is inoperative and generating said field default signal.

20. The method of claim 18, further including determining and indicating that said alternator is not operative via an engine off detection, and wherein said selecting and transmitting a field drive is further responsive to said engine off detection.

21. The method of claim 20, wherein said engine off detection, includes a frequency measurement to establish that a phase frequency exceeds a selected frequency threshold.

22. The method of claim 18, wherein said determining includes comparing if a supply voltage greater than selected value for a set-point voltage.

23. The method of claim 22, wherein said comparing includes hysteresis.

24. The method of claim 22, wherein said selected value is about 13.8 volts.

25. The method of claim 18, wherein said transmitting is responsive to a selector for selecting between said normal field control and wherein said selection apparatus comprises a circuit of logic gates configured to transmit one of a default field command and a normal field command.

26. An electric machine for providing a source of electrical power, comprising:

an alternator;

a first means for determining and providing an excitation to a field coil of said alternator;

a second means for determining and providing an excitation for said field coil of said alternator, said second means providing said excitation if said first means is inoperative; and a means for determining whether said first means is inoperative.

27. A regulator for providing excitation to an alternator in an electric power generating system, comprising:

means for receiving a field default signal indicative of an inoperative normal field control;

means for receiving a normal field control signal responsive to said normal field control, indicative of a desired duty cycle command to a field coil of the alternator;

means for formulating a default field command responsive to a selected value for a supply voltage;

means for selecting and transmitting a field drive responsive to said default field command to a field coil of the alternator if said field default signal is asserted, wherein said regulator includes an normal field control and a redundant field control.

28. The regulator of claim 27, further including means for determining and indicating that said normal field control is inoperative and generating said field default signal.

29. The regulator of claim 27, further including means for determining and indicating that the alternator is not operative via an engine off detection, and wherein said means for selecting and transmitting a field drive is further responsive to said engine off detection.

30. The electric power generating system as in claim 1, further comprising:

a means for determining and indicating whether said normal field control is not operative.

31. An electric power generating system, comprising:

an alternator; and a regulator, said regulator comprising:

a normal field control;

a redundant field control;

means for receiving a field default signal indicative of an inoperative normal field control;

means for receiving a normal field control signal responsive to said normal field control, indicative of a desired duty cycle command to a field coil of said alternator;

means for formulating a default field command responsive to a selected value for a supply voltage;

means for selecting and transmitting a field drive responsive to said default field command to a field coil of the alternator if said field default signal is asserted.

32. The electric power generating system as in claim 31, further comprising:

means for determining and indicating that said normal field control is inoperative and generating said field default signal.

33. The electric power generating system as in claim 31, further comprising:

means for determining and indicating that the alternator is not operative via an engine off detection, and wherein said means for selecting and transmitting a field drive is further responsive to said engine off detection.

* * * * *